United States Patent [19]
Dubois

[11] Patent Number: 5,986,416
[45] Date of Patent: Nov. 16, 1999

[54] APPARATUS AND METHOD FOR DRIVING A MECHANICALLY-DRIVEN DEVICE IN AN ELECTRICAL VEHICLE

[76] Inventor: Jean-Marie Dubois, 402 Odile, Laval, Canada, H7R5Y5

[21] Appl. No.: 08/987,278

[22] Filed: Dec. 9, 1997

[51] Int. Cl.$^6$ .................................................. H02P 1/54
[52] U.S. Cl. .............................. 318/139; 318/46; 318/113
[58] Field of Search .............................. 318/8, 9, 34, 41, 318/45, 46, 113, 139

[56] References Cited

U.S. PATENT DOCUMENTS

| | | | |
|---|---|---|---|
| 4,095,665 | 6/1978 | Armfield | 180/65.3 |
| 4,099,589 | 7/1978 | Williams | 180/65.2 |
| 4,293,281 | 10/1981 | Lamoreaux | 417/9 |
| 4,413,698 | 11/1983 | Conrad et al. | 180/305 |
| 4,489,242 | 12/1984 | Worst | 307/10.1 |
| 4,663,937 | 5/1987 | Cullin | 60/431 |
| 5,005,659 | 4/1991 | Jones et al. | 180/65.1 |
| 5,081,365 | 1/1992 | Field et al. | 290/45 |
| 5,166,584 | 11/1992 | Fukino et al. | 318/139 |
| 5,635,805 | 6/1997 | Ibaraki et al. | 318/139 |

*Primary Examiner*—Bentsu Ro
*Attorney, Agent, or Firm*—Brinks Hofer Gilson & Lione

[57] ABSTRACT

The apparatus is used for driving a mechanically-driven device in an electrical vehicle having at least one electrical traction motor. The apparatus comprises an auxiliary electrical motor mechanically connected to the device. The device is driven by the auxiliary motor when enabling conditions are not met, such as when the traction motor has a rotation speed which is slower than a pre-set rotation speed. When the proper conditions are met, the mechanical connection between the auxiliary motor and the traction motor is engaged and the auxiliary motor is electrically disconnected to save energy. The mechanical connection is disengaged when the proper conditions are no longer met. The apparatus is particularly suitable for use with a power steering pump.

11 Claims, 2 Drawing Sheets

APPARATUS AND METHOD FOR DRIVING A MECHANICALLY-DRIVEN DEVICE IN AN ELECTRICAL VEHICLE

BACKGROUND

The energy consumption in an electrical vehicle is a very important issue because batteries that are hitherto used do not provide an autonomy that is equivalent to the gas-powered vehicles. The main source of power of an electrical vehicle is generally the batteries. Such batteries are usually provided in a large number and are distributed in various locations throughout the vehicle. A major development in the field of batteries may some day allow the use of a reduced number of batteries, or perhaps a single battery, that would considerably make the vehicle lighter and with an enhanced autonomy. Meanwhile, the issue of energy consumption is still very significative for the automobile industry.

An electrical vehicle comprises an electrical traction motor that is connected to a front or rear wheel of the vehicle by means of a main axle. Depending on the design of the vehicle, the traction motor may power more than one wheel, either front or rear wheels. Some vehicles may also have a traction motor on each wheel. Very compact designs have even allowed the possibility of providing the traction motor as a motor wheel, where the motor is embedded within the rim of a wheel without any gear box.

Hybrid vehicles are also electrical vehicles by extension. Some hybrid vehicles use an auxiliary engine driving a generator to charge to main batteries. The driven generator provides additional power during specific conditions, such as high speed or loads. Other hybrid vehicles use a conventional engine with direct mechanical connection to the wheels for high speed and the electrical traction motor or motors for urban travelling or during a dense traffic. The conventional engine is switched off and disconnected from the wheels when the electrical traction motor or motors are used.

The traction motor or motors are usually not the only systems that use power since an electrical vehicle comprises many other electrical equipments or mechanically-driven devices, depending on the options. Examples of electrical equipments are the electric or electronic controls, the blower fan, the wiper motor, the interior and exterior lights, the powered windows or door locks, the defroster, etc. Typical examples of mechanically-driven devices are a power steering pump for a power steering system or a compressor for an air conditioning unit. The power steering pump is a major problem on the electrical vehicles.

In general, the electrical equipments are connected to a "low" voltage DC circuit, of 12 or 24 volts for instance, itself connected to an auxiliary battery of the vehicle. The main batteries supply power at a relatively "high" voltage for driving the traction motor or motors. The high voltage is about 72 to 144 Volts DC for instance. It may be higher for specific applications. The low voltage DC circuit is usually powered by the main batteries with the use of a DC-DC converter and an auxiliary low voltage battery. A very common problem with DC-DC convertor is that the output low tension tends to fluctuate as the input high tension changes. For instance, the voltage of the main batteries drops whenever the vehicle accelerates. The fluctuation is often felt in the electrical equipments connected to the low voltage DC circuit, as for instance, the intensity of the lights changes or the speed of the wiper motor varies. These fluctuations are very disturbing over time for both the driver and the passengers. One way to resolve the problem is to use a highly efficient DC-DC convertor. However, the high cost of such convertors is a major inconvenient.

The mechanically-driven devices in an electrical vehicle, which generally comprise a power steering pump, are driven by an auxiliary motor. The auxiliary motor usually runs continuously whenever a corresponding device needs to be driven, regardless of the speed of the vehicle. As a result, the traction motor or motors and the auxiliary motor are often driven simultaneously when the vehicle is in motion. Some electrical energy is thus wasted, partly because the auxiliary motor is not perfectly efficient and is usually less efficient than a traction motor. Moreover, the operation of the auxiliary motor in addition to the traction motor or motors adds unnecessary noise.

SUMMARY

The object of the present invention is to provide an apparatus for driving a mechanically-driven device in an electrical vehicle that achieves a lower energy consumption by allowing the mechanically-driven device to be powered by a traction motor when the conditions are favorable, such as when the rotation speed of the traction motor is sufficient. The auxiliary motor is then switched off during that time to save energy. It is also an object of the present invention to provide a corresponding method of driving a mechanically-driven device in an electrical vehicle.

According to the present invention, the apparatus comprises an auxiliary electrical motor mechanically connected to the mechanically-driven device. A connecting means provides a disengageable mechanical connection between the auxiliary motor and the electrical traction motor. A control means is used for controlling the connecting means and electrically disconnecting the auxiliary motor when the mechanical connection between the traction motor and the auxiliary motor is engaged.

The method according to the present invention comprises the steps of:

driving the device with an auxiliary electrical motor when the traction motor has a rotation speed which is slower than a pre-set rotation speed;

engaging a mechanical connection between the auxiliary motor and the traction motor when enabling conditions are met;

electrically disconnecting the auxiliary motor whenever the mechanical connection between the auxiliary motor and the traction motor is engaged;

disengaging the mechanical connection when the enabling conditions are no longer met; and electrically reconnecting the auxiliary motor whenever the mechanical mechanism is disengaged.

A non-restrictive description of a preferred embodiment will now be given with reference to the appended drawings.

IDENTIFICATION OF THE COMPONENTS

Figure 1:
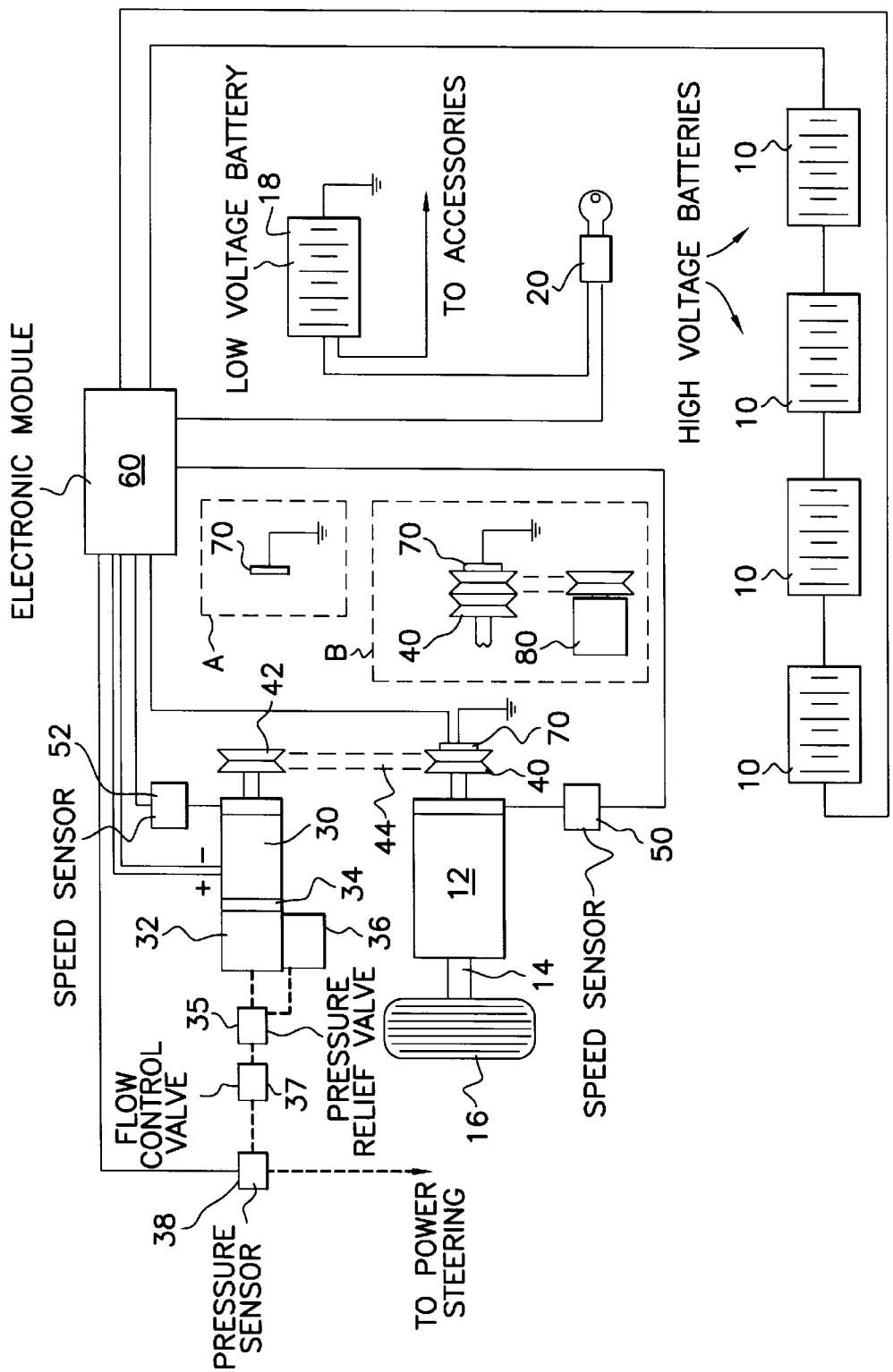
FIG. 1 is a schematic view of a possible embodiment of the present invention.

The following is a list of the reference numerals, along with the names of the corresponding components, that are used in the appended drawings and in the description.

10 main batteries
12 traction motor
14 main axle (of the traction motor)
16 wheel
18 auxiliary battery
20 main switch
30 auxiliary motor
31 main axle (of the auxiliary motor)
32 mechanically-driven device (e.g. power steering pump)
34 adaptor (for the power steering pump)
35 pressure relief valve (for the power steering pump)
36 hydraulic fluid reservoir (for the power steering pump)
37 flow control valve (for the power steering pump)
38 pressure sensor (for the power steering pump)
40 first pulley (of the traction motor)
42 second pulley (of the auxiliary motor)
44 belt
50 first speed sensor (of the traction motor)
52 second speed sensor (of the auxiliary motor)
54 potentiometer
56 potentiometer
60 electronic module
62 fuse
64 power controller
66 micro-controller
70 electro-magnetic clutch
72 clutch, switching circuit
74 fuse
80 alternator (or air conditioning compressor)

Description

Referring now to FIG. 1, there is shown a possible embodiment of the present invention. The illustrated embodiment comprises a traction motor (12) mechanically connected to the wheel (16) of the vehicle by means of a main axle (14). It should be noted that the expression "mechanical connection" and "mechanically connected" used in the specification and in the claims mean that the corresponding parts are in a rotational driving relationship.

The electrical power for the traction motor (12) is provided by means of main batteries (10). The electrical connections between the traction motor (12) and the main batteries (10), power controls and fuses are not illustrated to simplify the drawings as they are well known in the art. The traction motor (12) operates at a relatively high DC voltage compared to the conventional 12 or 24 Volts DC of the electrical equipments of the vehicle. A typical "high" DC voltage is about 72 to 144 Volts. Of course, the design may vary according to the specific needs and requirements. An example of the traction motor (12) is an Advance™ DC Motor, 20 HP, 72–120 Volts DC, 6000 RPM. A suitable controller (not shown) for this motor is a Curtis™ controller, model 1221 B, 120 Volts DC, 400 A. The main pack batteries (10) may be Trojan™ batteries, model SCS 225 or the like.

As aforesaid in the background section on the present specification, there are many possible designs of traction motor (12). Depending on the design of the vehicle, the main axle (14) of a traction motor (12) may power more than one wheel (16), either front or rear wheels. Some vehicles may also have a traction motor (12) on each wheel (16). Yet, the expression "traction motor" is used regardless of the position thereof. Some traction motors (12) may be further provided with energy recovery braking capabilities, where the braking torque goes from the wheel (16) to the corresponding traction motor (12) and is transformed back into electrical energy that is stored into the main batteries (10).

The present invention provides an apparatus for driving a mechanically-driven device. An example of such device is a power steering pump (32) of a power steering system or an air conditioning compressor (80). Other devices are possible as well, such as an alternator for directly charging an auxiliary battery (18) in substitution of the DC-DC converter. In the illustrated embodiment, the device is driven by an auxiliary electrical motor (30). The auxiliary motor (30) has a main axle (31) mechanically connected to an input axle of the device. The mechanical connection can be direct, such as when the main and input axles are combined in a single axle, or indirect, such as when an internal or external mechanical linkage is used, such as a gearbox, a belt, a chain, etc. A disengaging system (not shown), such as a clutch, can also be provided between the device and the auxiliary motor (30). An example of a power steering pump is a Saginaw™ pump, GM part number 26016157 or the equivalent. It preferably includes a hydraulic fluid reservoir (36).

The auxiliary motor (30) is powered by the main batteries (10). Highly efficient electrical motors generally use a "high" voltage, which is then conveniently equivalent to the one of the traction motor (12). Power lines, fuses and controls are provided, as apparent to a person skilled in the art.

The electrical components of the electrical vehicle is generally powered by the 12-or 24-Volt battery (18). All electronics can be combined into a single electronic module (60). An example of an auxiliary motor (30) is an electrical motor from United Technologies Automotive, 1.5 HP, 4500 RPM, 100 Volts DC. The auxiliary motor (30) starts to rotate when the main switch (20) is activated. The auxiliary motor (30) may have more than one stage of operation, whereby the motor (30) rotates slower than normally if the device to be driven requires only a reduced torque.

The present invention further comprises a connecting means for providing a disengageable mechanical connection between the main axle (31) of the auxiliary motor (30) and the main axle (14) of the electrical traction motor (12) so that the auxiliary motor (30) can be switched off to save energy. Of course, the traction motor (12) has to rotate fast enough, otherwise the device may not work efficiently. Additional parameters can be taken into account, such as load, road conditions or time. The auxiliary motor (30) would then be reactivated if the minimal conditions for an optimal operation are not met.

In FIG. 1, the connecting means comprises opposite first and second pulleys (40,42) respectively connected to the main axle (14) of the traction motor (12) and the main axle (31) of the auxiliary motor (30). The pulleys (40,42) may have a single or double groove, such as shown in option B in FIG. 1.

The pulleys (40,42) are then mechanically connected together by a belt (44). A clutch (70) is then mounted between one of the main axles (14, 31) and its respective pulley, preferably between the main axle (14) of the traction motor (12) and the first pulley (40). Alternatively, the clutch (70) may be operatively connected to the main axle (31) of the auxiliary motor (30), as shown in option A in FIG. 1.

A possible clutch is an electromagnetic clutch (70) and an example thereof is an Ogura™ clutch, model 502287. One terminal of the clutch (70) is connected to the ground and the clutch (70) is engaged as soon as the positive terminal receives a potential from an electronic controller, as explained hereinafter.

The connecting means may also comprise opposite first and second sprockets instead of pulleys (40, 42). The sprockets are then mechanically connected together by a chain and the clutch is mounted between one of the main axles (14, 31) and its respective sprocket, preferably between the main axle (14) of the traction motor (12) and the second sprocket. The opposite pulleys or sprockets may have a different diameter for a speed reduction or a speed demultiplication. Moreover, the portion of the main axle (14) of the traction motor (12) on which is connected the auxiliary motor (30) is either opposite the wheel (16) or located between the wheel (16) and the traction motor (12).

FIG. 1 shows the power steering pump (32) directly connected on the side of the auxiliary motor (30). An adaptor (34) is used to attach the power steering pump (32) to the auxiliary motor (30). It would have also been possible to mechanically connect the device to the auxiliary motor (30) by means of the belt (44), or an additional belt (not shown) when using a double-groove pulley, for instance.

Figure 2:
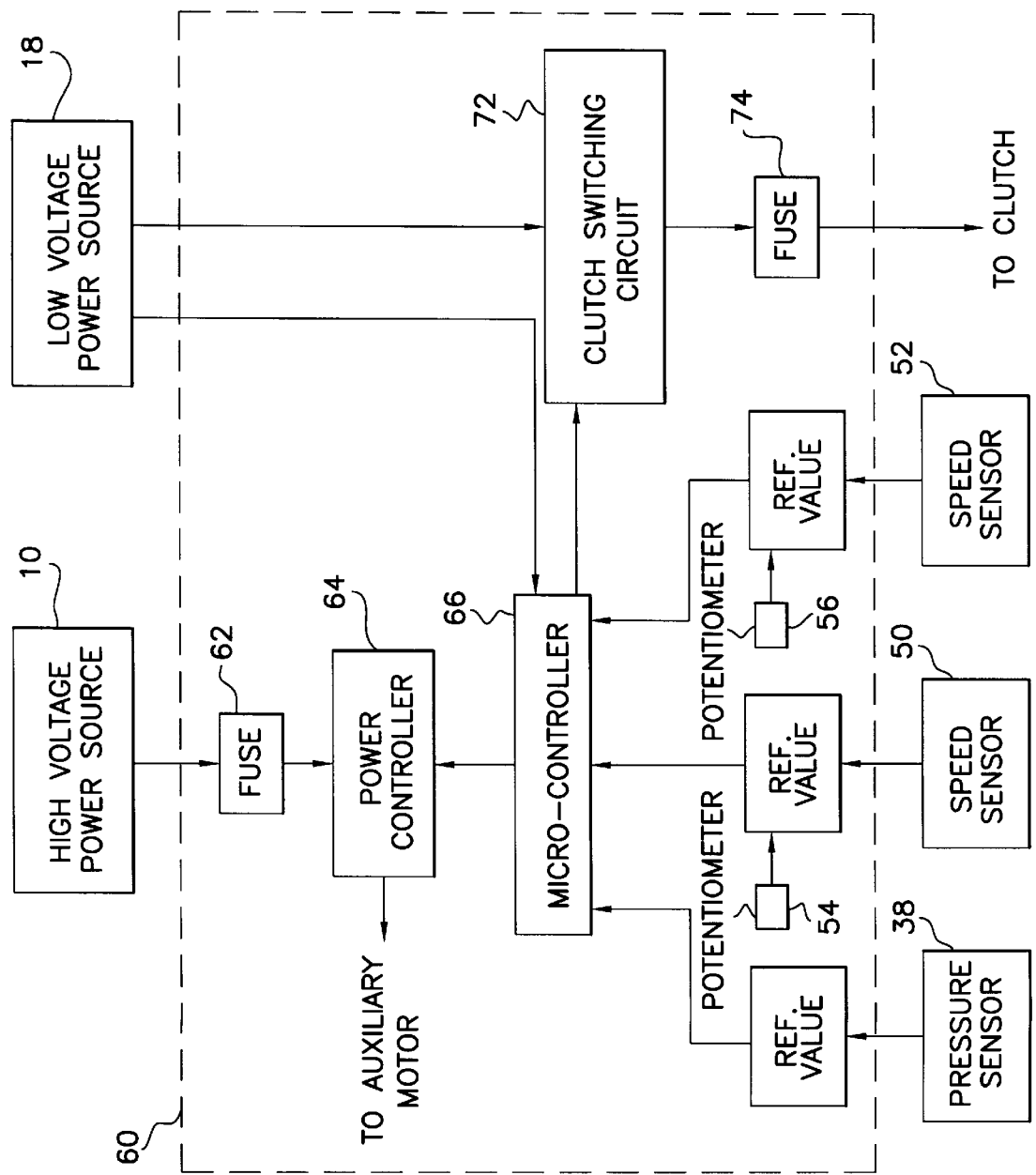
FIG. 2 is a block diagram of the electronic module shown in FIG. 1.

As aforesaid, an electronic module (60) is provided for controlling the connecting means and electrically disconnecting the auxiliary motor (30) when the mechanical connection between the main axles (14,31) is engaged. Preferably, the electronic module (60) also controls the rotation speed of the auxiliary motor (30). FIG. 2 schematically illustrates the operations inside the electronic module (60).

The electronic module (60) preferably comprises a first sensor (50) that is used for generating a first signal indicative of the rotation speed of the traction motor (12). The first sensor (50) may be connected to the speed sensor (not shown) of the vehicle. The readings would then give an indication of the rotation speed and possibly an indication of the load. Alternatively, the first sensor (50) may comprise any other kind of speed detecting systems, such as a Hall effect sensor.

As also shown in FIG. 2, the high voltage power source (10) is electrically connected to a power controller (64). A fuse (62) protects the power controller (64) from a surcharge. The power controller (64) receives commands from a micro-controller (66), which determines when and how much electrical energy is to be sent to the auxiliary motor (30). The micro-controller (66) further governs the clutch switching circuit (72), which switches the clutch (70) on and off. A fuse (74) protects the clutch (70) from a surcharge.

In use, the device is driven with the auxiliary motor (30) when the enabling conditions are not met, such as when the traction motor (12) has a rotation speed which is slower than a pre-set rotation speed. A typical pre-set rotation speed would be 400 RPM. This value is stored in a corresponding memory as a reference value and is preferably adjustable by means of the potentiometer (54). When the proper conditions are met, the mechanical connection between the auxiliary motor (30) and the traction motor (12) is engaged and the auxiliary motor (30) is electrically disconnected to save energy. The most important energy savings are done when the driver releases the speed pedal to slow down the vehicle or when the vehicle goes down a hill because it uses a portion of the cinetic energy that would be wasted, especially if no energy-recovery system is used on the vehicle.

The mechanical connection is disengaged when the proper conditions are no longer met, such as when the rotation speed of the traction motor (12) falls back below the pre-set rotation speed. It will be reactivated if the conditions are met once again.

The auxiliary motor (30) may further comprise a second sensor (52) that monitors the rotation speed of the auxiliary motor (30) and which is electrically connected to the electronic module (60), more particularly to the micro-controller (66). The second sensor (52) is used to inform the micro-controller (66) if the speed of the auxiliary motor (30) needs to be regulated so that any change in the load can be compensated to maintain the speed within given rotation speed limits. A reference value for the basic rotation speed of the auxiliary motor (30) is stored in a corresponding memory and is preferably adjustable by means of a potentiometer (56).

The hydraulic line of the power steering pump (32), if any, may be connected to a pressure sensor (38) that monitors that pressure and further controls the auxiliary motor (30) in function of the demand in pressurized fluid. If the pressure is high enough, the auxiliary motor (30) can be switched to a higher stage of operation until the pressure drops again below a reference value. A pressure relief valve (35) and a flow control valve (37) are located between the pump (32) and the pressure sensor (38). These valves (35,37) are usually provided within the pump (32) or at the output thereof. They are also adjustable according to specifications of the vehicle manufacturers. In some cases, it may be useful that the pressure sensor (38) be used to send a signal to the electronic module (60) if the hydraulic pressure is very high, such as during parking maneuvers. The rotation speed of the auxiliary motor (30) may then be increased. In other cases, other devices, such as the air conditioning compressor, may be temporarily disconnected from the auxiliary motor (30) in response to the signal from the pressure sensor (38). The priority will then be given to the pump (32) during the parking maneuvers.

Although a preferred embodiment of the invention has been described in detail herein and illustrated in the accompanying drawings, it is to be understood that the invention is not limited to this precise embodiment and that various changes and modifications may be effected therein without departing from the scope or spirit of the present invention.

What is claimed is:

1. An apparatus for driving a mechanically-driven device in an electrical vehicle having at least one electrical traction motor, the apparatus comprising:

an auxiliary electrical motor mechanically connected to the mechanically-driven device;

a connecting means for providing a disengageable mechanical connection between the auxiliary motor and the electrical traction motor; and a control means for controlling the connecting means and electrically disconnecting the auxiliary motor when the mechanical connection between the traction motor and the auxiliary motor is engaged.

2. An apparatus according to claim 1, wherein the traction motor and the auxiliary motor comprise respective main axles, the connecting means comprising a clutch operatively connected to one of the main axles to selectively engage or disengage the mechanical connection between the auxiliary motor and the traction motor.

3. An apparatus according to claim 2, wherein the connecting means comprises opposite first and second pulleys respectively connected to the main axle of the auxiliary and the traction motor, the pulleys being mechanically connected together by a belt, the clutch being mounted between one of the main axles and its respective pulley.

4. An apparatus according to claim 3, wherein the clutch is located between the main axle of the traction motor and the second pulley.

5. An apparatus according to claim 2, wherein the connecting means comprises opposite first and second sprockets respectively connected to the main axle of the auxiliary and the traction motor, the sprockets being mechanically connected together by a chain, the clutch being mounted between one of the main axles and its respective sprocket.

6. An apparatus according to claim 5, wherein the clutch is located between the main axle of the traction motor and the second sprocket.

7. An apparatus according to claim 1, wherein the control means comprises:

a first sensor means for generating a first signal indicative of the rotation speed of the traction motor.

8. An apparatus according to claim 7, wherein the control means further comprises:

a second speed sensor for generating a second signal indicative of the rotation speed of the auxiliary motor, and a regulation means responsive of the second signal for adjusting the rotation speed of the auxiliary motor in function of a load variation.

9. A method of driving a mechanically-driven device in an electrical vehicle having at least one electrical traction motor having a main axle, the method comprising the steps of:

driving the device with an auxiliary electrical motor when the traction motor has a rotation speed which is slower than a pre-set rotation speed;

engaging a mechanical connection between the auxiliary motor and the traction motor when enabling conditions are met;

electrically disconnecting the auxiliary motor whenever the mechanical connection between the auxiliary motor and the traction motor is engaged;

disengaging the mechanical connection when the enabling conditions are no longer met; and electrically reconnecting the auxiliary motor whenever the mechanical mechanism is engaged.

10. A method according to claim 9, wherein the enabling conditions comprise the rotation speed of the traction motor, the conditions being met when the rotation speed is equal to or greater than a pre-set rotation speed.

11. A method according to claim 9, further comprising the step of:

generating a signal indicative of the rotation speed of the auxiliary motor while it is electrically connected and receiving an amount of electrical energy;

obtaining a value of the rotation speed of the auxiliary motor from the signal;

comparing the obtained value with a pre-set value; and adjusting the electrical energy supplied to the auxiliary motor to change the rotation speed thereof if the obtained value and the pre-set value are not substantially equal.

* * * * *